United States Patent [19]

Sawaya

[11] Patent Number: 5,439,371
[45] Date of Patent: Aug. 8, 1995

[54] LOCALLY PRESSURIZING INJECTION MOLDING MACHINE

[75] Inventor: Atsushi Sawaya, Chiba, Japan

[73] Assignee: Sumitomo Heavy Industries, Ltd., Japan

[21] Appl. No.: 128,295

[22] Filed: Sep. 29, 1993

[30] Foreign Application Priority Data

Oct. 7, 1992 [JP] Japan .................................. 4-268553

[51] Int. Cl.$^6$ .............................................. B29C 45/40
[52] U.S. Cl. ..................... 425/553; 264/334; 4425/554; 4425/556
[58] Field of Search ........... 425/553, 554, 556, 436 R, 425/444; 264/334

[56] References Cited

U.S. PATENT DOCUMENTS 2,330,369 9/1943 Marsh .................................. 425/554
4,710,124 12/1987 Harrison ............................. 425/554
5,074,779 12/1991 Tsutsumi et al. .................... 425/556

FOREIGN PATENT DOCUMENTS 8414995 7/1985 Germany .
4369517 12/1992 Japan .
1416870 12/1975 United Kingdom .

OTHER PUBLICATIONS

Patent Abstracts of Japan, vol. 9, No. 316 12 Dec. 85 60-151013.

Primary Examiner—Tim Heitbrink
Attorney, Agent, or Firm—Lorusso & Loud

[57] ABSTRACT

A locally pressurizing type injection molding machine includes a stationary die and a movable die, so that a molded product can be formed by charging a resin into a cavity defined between the dies. A pressurizing pin extends through the movable die and has its tip end facing at least one of a resin passage and the cavity. A pressurizing cylinder is disposed at the rear of the pressurizing pin to move the pressurizing pin through the pressurizing rod. Therefore, the resin charged in the cavity can be pressurized by advancing the pressurizing pin into a resin passage, for example, a gate, the cavity or the like and hence, it is possible not only to provide an extremely thin molded product, but also to prevent the generation of a sink mark. The area occupied by the movable platen can be reduced by disposing the pressurizing rod and ejector rod coaxially.

7 Claims, 12 Drawing Sheets (a) MOLDING STATE (b) PUNCH VIBRATION (c) VIBRATION PUNCHING

LOCALLY PRESSURIZING INJECTION MOLDING MACHINE

BACKGROUND OF THE INVENTION

FIELD OF THE INVENTION

The present invention relates to a locally pressurizing type injection molding machine.

DESCRIPTION OF THE PRIOR ART

There are conventionally proposed locally pressurizing type injection molding machines in which various workings are applied to a molded product by pressurizing a local portion of a resin within a cavity, thereby eliminating the need for the boring of a thin plate, the finishing of a cut surface and the like.

FIG. 1 is a view illustrating an essential portion of the prior art locally pressurizing type injection molding machine. FIG. 1(a) illustrates a molding; and FIG. 1(b) and FIG. 1(c) illustrate vibration punching.

Referring to FIG. 1, the prior art locally pressurizing type injection molding machine comprises a stationary die 1 mounted to a stationary platen, a movable die 2 mounted to a movable platen which is not shown, a cavity 3 defined between the stationary and movable dies 1 and 2, a sprue 4 through which a resin is injected from an injection nozzle (not shown), a gate 5 defined between the sprue 4 and the cavity 3, a stationary punch 6 disposed on the stationary die 1, and a movable punch 7 disposed on the movable die 2.

The stationary and movable punches 6 and 7 are vibrated by vibrating devices (not shown) disposed within the stationary and movable dies 1 and 2, respectively, during a cooling step, after the completion of a pressure maintaining step in an injection molding cycle. The stationary and movable punches 6 and 7 are previously disposed at locations where working is conducted and hence, as shown in FIG. 1(a), heat due to shear stress is generated in such a working portion (e.g., a boring portion or a gate 5) between the stationary and movable punches 6 and 7 by vibration of the movable punch 7, thereby softening the resin.

In this state, if for example, the movable punch 7 is moved toward stationary punch 6, as shown in FIG. 1(b), while vibrating the stationary and movable punches 6 and 7, the softened resin is cut, as shown in FIG. 1(c). In this case, the cut made by the movable punch 7 is finished and cooled by the vibration, thereby providing a glossy worked surface of a high accuracy.

In the above prior art locally pressurizing type injection molding machine, however, an actuator which is the stationary punch 6 is disposed within the stationary die, while an actuator which is the movable punch 7 is disposed within the movable die 2, resulting in an increased cost.

SUMMARY OF THE INVENTION

It is an object of the present invention to provide a locally pressurizing type injection molding machine, wherein the problems associated with the prior art locally pressurizing type injection molding machine are overcome, and actuators are disposed exterior to the stationary die and movable die, thereby reducing cost.

To achieve the above object, according to the present invention, there is provided a locally pressurizing type injection molding machine comprising a stationary die and a movable die disposed for movement into and out of contact with the stationary die and defining a cavity therebetween. A pressurizing pin extends through the movable die, with its tip end facing at least one of a resin passage and the cavity. A pressurizing cylinder is disposed at the rear of the pressurizing pin for moving the pressurizing pin through the pressurizing rod. An ejector pin extends through the movable die, with its tip end facing the cavity, and an ejecting cylinder is disposed in rear of the ejector pin for moving the ejector pin through the ejector rod.

The pressurizing pin extends through the movable die, with its tip end facing at least one of the resin passage and the cavity. The pressurizing cylinder is disposed in rear of the pressurizing pin to move the pressurizing pin through the pressurizing rod. Therefore, the resin charged in the cavity can be pressurized by advancing the pressurizing pin into the resin passage such as a gate, the cavity or the like, thereby producing an extremely thin molded product, but also preventing the generation of a sink mark.

Further, the ejector pin extends through the movable die, with its tip end facing the cavity. The ejecting cylinder is disposed in rear of the ejector pin to move the ejector pin through the ejector rod. Therefore, actuators for the pressurizing pin and the ejector pin can be disposed outside the stationary and movable dies, leading to a reduced cost for the stationary and movable dies.

Further, the pressurizing rod and the ejector rod may be disposed coaxially, thereby reducing the area occupied by the movable platen and providing an improved mountability.

Further, a plurality of the pressurizing rods may be disposed on and synchronized by a pressurizing cross head. This ensures that an inclination of the pressurizing plate can be prevented, and the pressurizing plate and the pressurizing pin can be prevented from being damaged. Moreover, it is possible to reduce the variability in the stroke of each pressurizing pin to provide an uniform pressurizing force.

The above and other objects, features and advantages of the invention will become apparent from a consideration of the following description of the preferred embodiments taken in conjunction with the accompanying drawings.

DESCRIPTION OF PREFERRED EMBODIMENTS

The present invention will now be described by way of preferred embodiments in connection with the accompanying drawings.

Figure 1A:
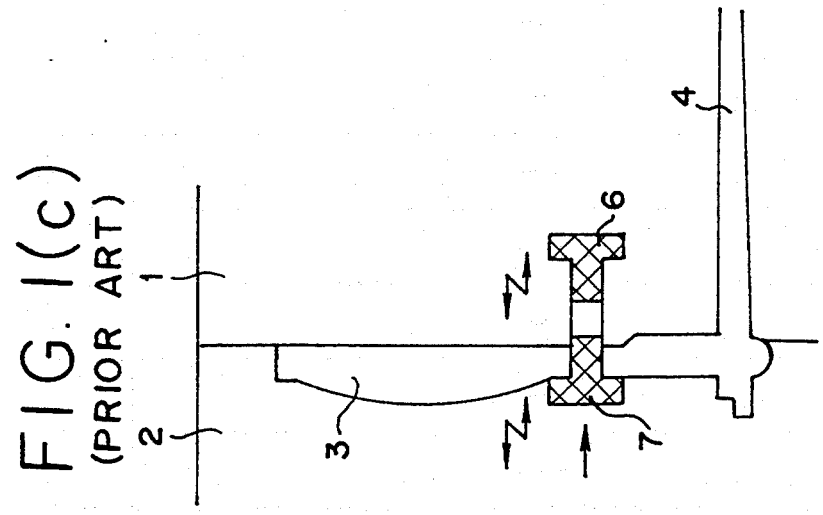
FIG. 1(a), 1(b) and 1(c) illustrate operation of the prior art locally pressurizing type injection molding machine.
Figure 1B:
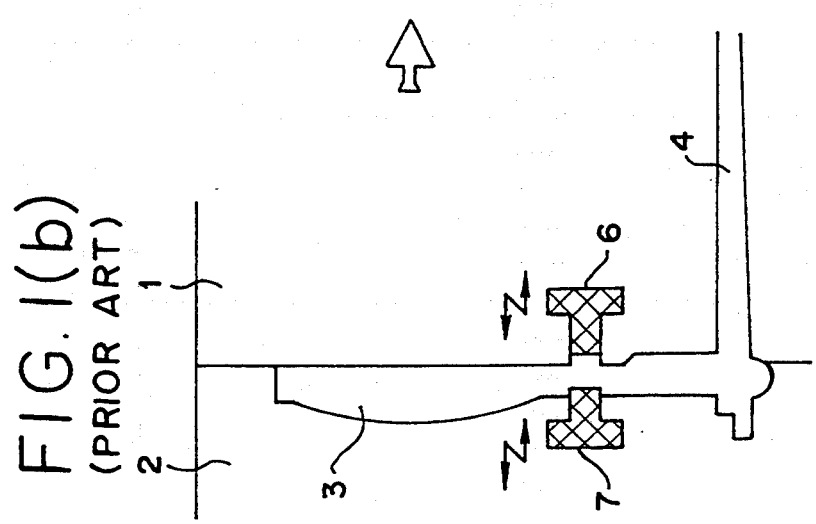
Figure 1C:
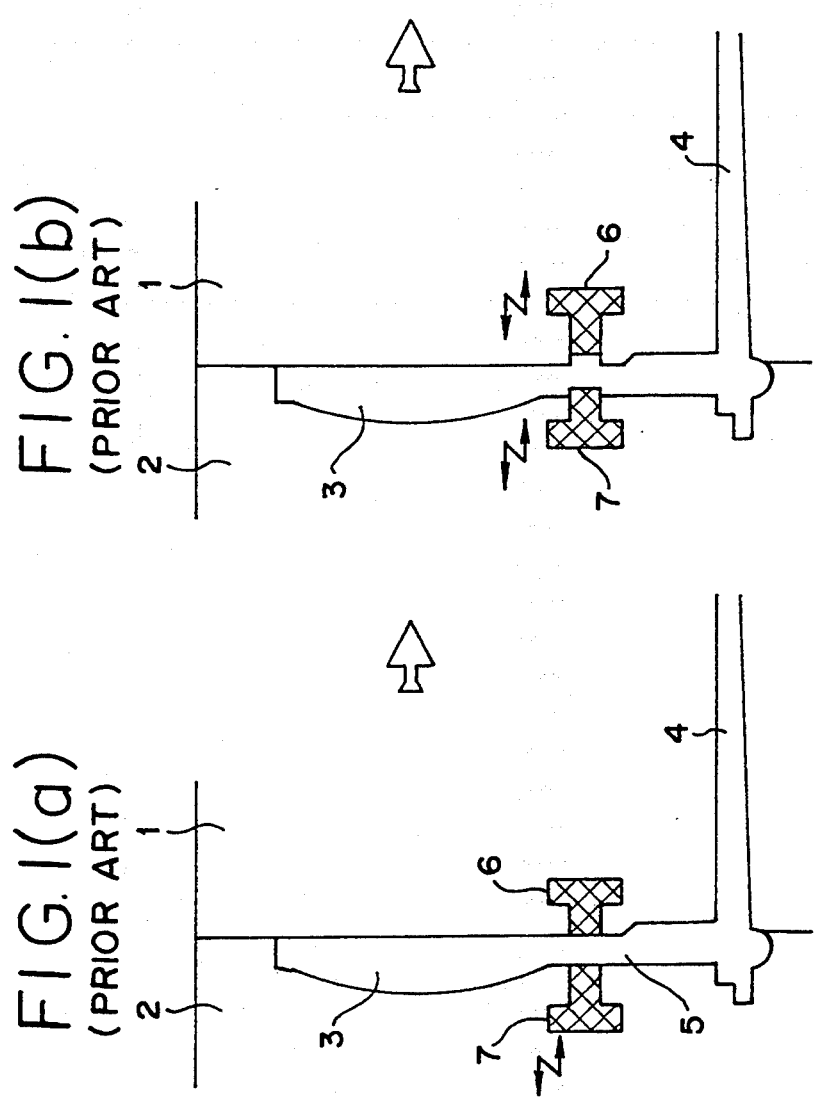

Referring to FIGS. 2 to 5, a locally pressurizing type injection molding machine according to a first embodiment of the present invention is illustrated. This injection molding machine comprises a stationary die 12 mounted to a stationary platen which is not shown, and a movable die 13 opposed to the stationary die 12 and adapted to be advanced and withdrawn (moved laterally as viewed in FIG. 1) into and out of contact with the stationary die 12 by a die clamping device which is not shown. The movable die 13 is fixed on a movable platen 15 with a spacer block 14 interposed therebetween. For convenience, the spacer block 14 is illustrated as being integral with the movable die 13. The movable platen 15 is adapted to be advanced and withdrawn along four tie bars 40 by a die opening/closing device which is not shown.

In the injection step, a resin is injected from an injection nozzle (not shown) and is passed from a sprue 18 through a runner 19 and via gate 20, such as a submarine gate, into a cavity 21 defined between the stationary and movable dies 12 and 13.

The injection step is followed by a pressure maintaining step at which the pressure in the cavity 21 is increased in order to prevent a sink (shrink) mark from being produced in a molded product by cooling of the resin. This step is followed by a cooling step in which the cooling of the resin within the cavity 21 is started.

In order to gate-cut the molded product during the pressure-maintaining step or at an initial stage of the cooling step, a pressurizing pin 33 is provided for each gate 20.

Each pressurizing pin 33 has a tip end face having an area corresponding to that of a gate 20 and is disposed at a location where the molded product is gate-cut by the pressurizing pin 33 itself. Therefore, the structure is such that the pressurizing pin 33 itself gate-cuts the molded product and hence, it is possible to simplify the structures of the stationary and movable dies 12 and 13. The pressurizing pin 33 is clamped and fixed at its trailing end by a pressurizing plate 36, so that the pressurizing pin 33 can be advanced and withdrawn by advancing and withdrawing the pressurizing plate 36.

The spacer block 14 includes a restraining member disposed so that the pressurizing plate 36 may be advanced and withdrawn only to a predetermined extent. In the Figures, a solid line indicates a retreat limit for the pressurizing plate 36, and a two-dot dashed line indicates an advance limit for the pressurizing plate 36.

Figure 2:
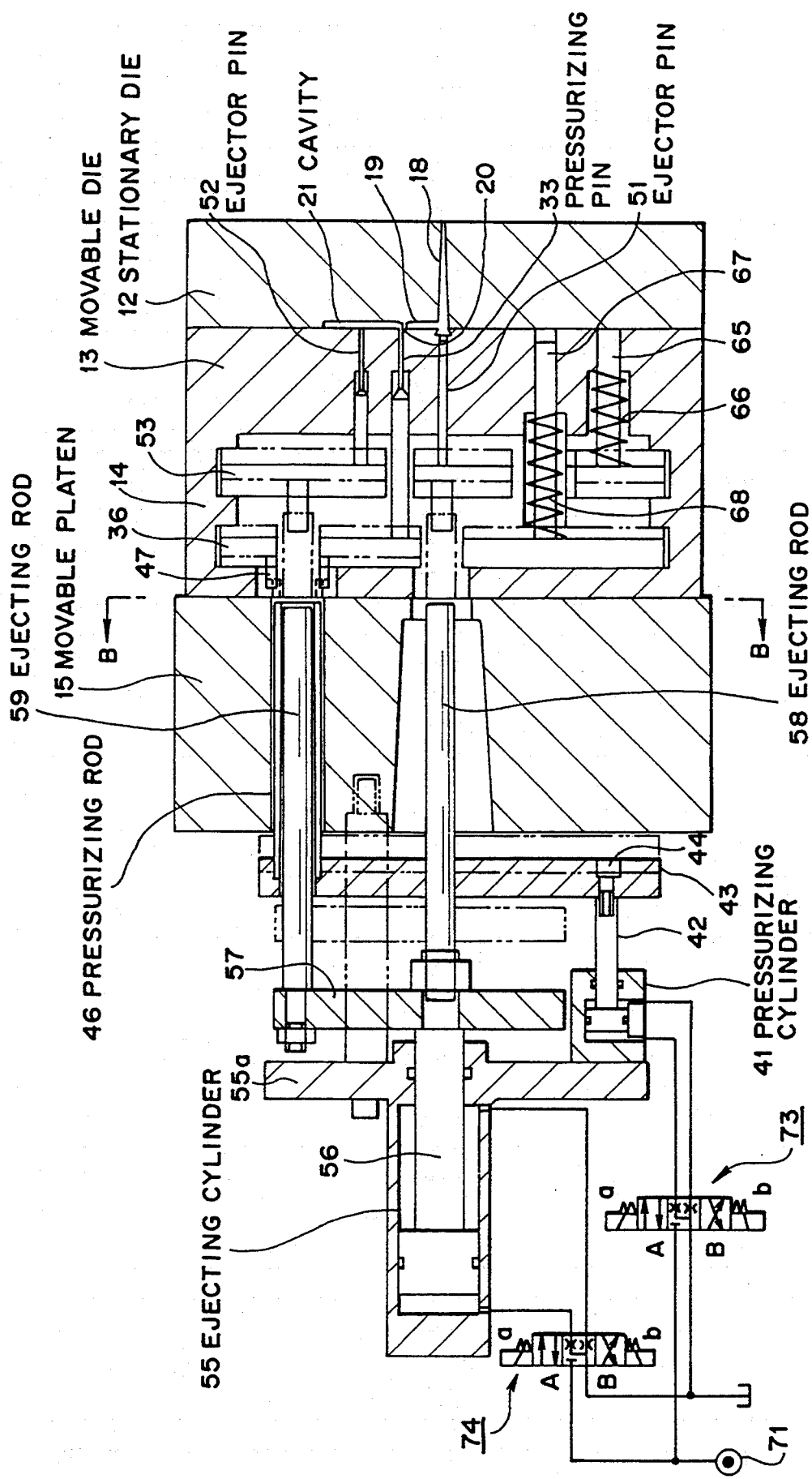
FIG. 2 is a sectional view of a locally pressurizing type injection molding machine according to a first embodiment of the present invention.
Figure 3:
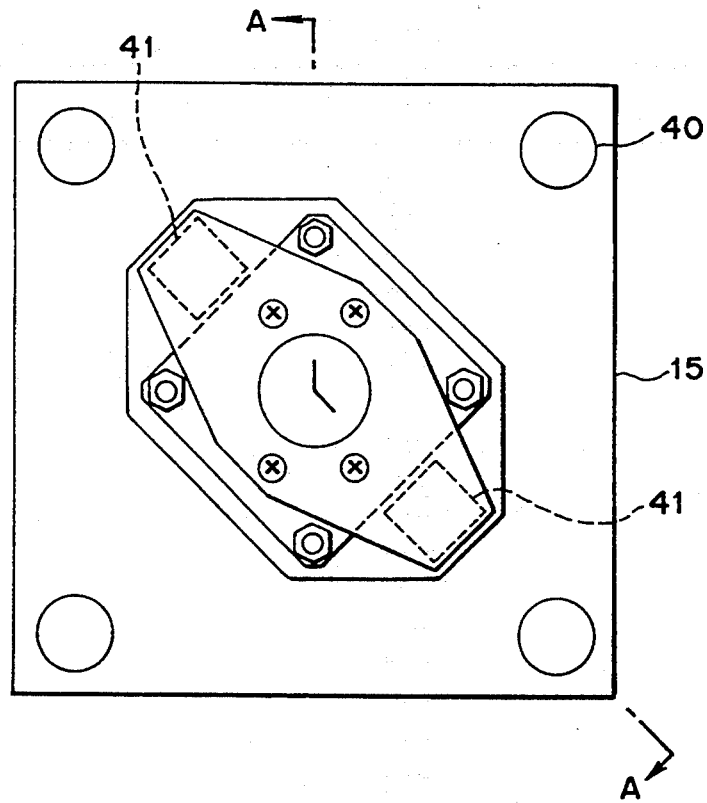
FIG. 3 is a side view of the locally pressurizing type injection molding machine shown in FIG. 2.

Two pressurizing cylinders 41 are disposed on the movable platen 15 on a diagonal line connecting two tie bars 40, as shown in FIGS. 2 and 3, so that the pressurizing pins 33 can be advanced and withdrawn by operation of the pressurizing cylinders 41. To this end, a piston rod 42 of the pressurizing cylinder 41 is fixed to a pressurizing cross-head 43 by a bolt 44, and four sleeve-like pressurizing rods 46 are fixed to the pressurizing cross-head 43 to project forwardly (rightwardly as viewed in FIG. 2). On the other hand, the pressurizing plate 36 has a sleeve-like protrusion 47 aligned with an end face of the pressurizing rod 46 and projecting rearwardly (leftwardly as viewed in FIG. 2). It should be noted that the number of the pressurizing rods 46 need not necessarily be four, but the number of the pressurizing rods 46 can be increased or decreased as required.

This, when the pressurizing cylinder 41 is operated to advance the piston rod 42, the pressurizing rod 46 is advanced through the cross head 43. Then, the distal end of the pressurizing rod 46 abuts against the sleeve-like protrusion 47. Therefore, if the pressurizing cylinder 41 is further operated to advance the piston rod 42, the pressurizing pin 33 is advanced through the pressurizing plate 36.

The pressurizing rods 46 are clamped and fixed to the pressurizing cross head 43, and hence, the four pressurizing rods 46 can be synchronously advanced by operation of the pressurizing cylinders 41. In this manner, it is possible to prevent the pressurizing plate 36 from canting, so that the pressurizing plate 36 and the pressurizing pin 33 are prevented from being damaged. Moreover, it is possible to reduce the variability in stroke of movement of each pressurizing pin 33 to provide a uniform pressurizing force.

A single ejector pin 51 is disposed so that its tip end faces the sprue 18, and a plurality of ejector pins 52 are disposed so that their tip ends face predetermined points of the cavity 21. Trailing ends of the ejector pins 51 and 52 are clamped and fixed to the ejector plate 53. The spacer block 14 includes a restraining member disposed so that the ejector plate 53 may be advanced and withdrawn to a predetermined extent. In the Figures, a solid line indicates a retreat limit for the ejector plate 53, and a two-dot dashed line indicates an advance limit for the ejector plate 53, as in the case of the pressurizing plate 36.

Figure 4:
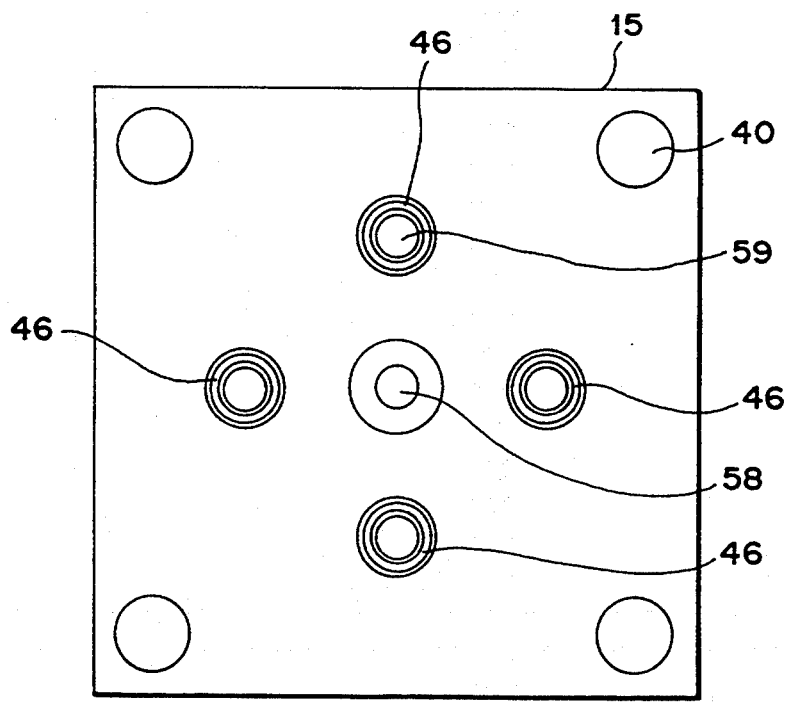
FIG. 4 is a sectional view taken along a line B—FIG. 2.
Figure 5:
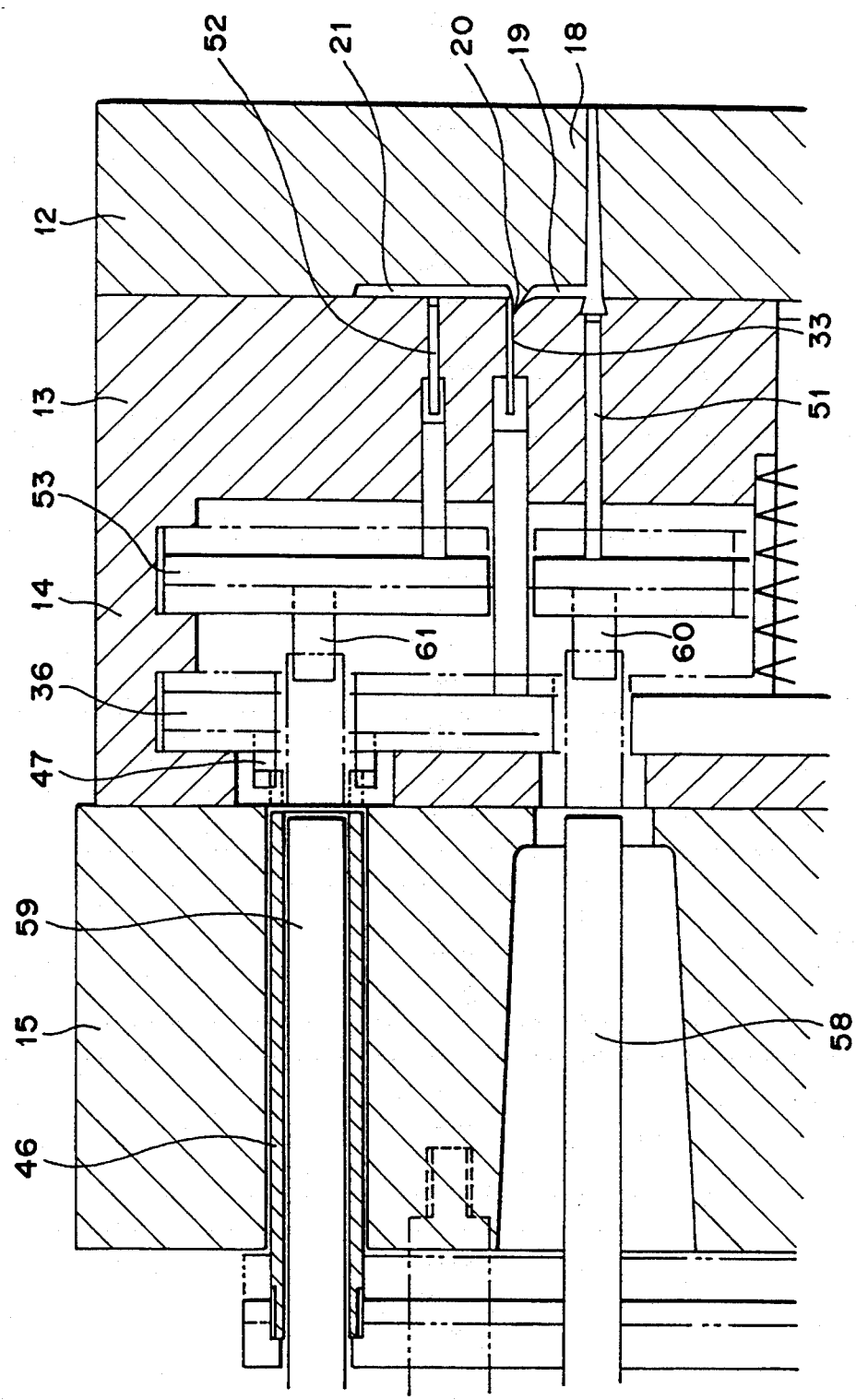
FIG. 5 is an enlarged view of an essential portion shown in FIG. 2.

An ejecting cylinder 55 is disposed at a central portion of the movable platen 15, so that the ejector pins 51, 52 may be advanced and withdrawn by operation of the ejecting cylinder 55. For this purpose, an ejecting cross head 57 is fixed to a piston rod 56 in the ejecting cylinder 55, and as shown in FIG. 4, a single ejecting rod 58 is fixed to a central portion of the ejecting cross head 57, while four ejecting rods 59 are fixed to the ejecting cross head 57 at locations corresponding to the pressurizing rods 46, the ejecting rods 58 and 59 projecting forwardly. The ejecting rods 59 are disposed to extend through the pressurizing rods 46.

On the other hand, protrusions 60 and 61 are projectingly formed on the ejector plate 53 at locations corresponding to the ejecting rods 58 and 59 to extend rearwardly.

Thus, if the ejecting cylinder 55 is operated to advance the piston rod 56, the ejecting rods 58 and 59 are advanced through the ejecting cross head 57. Then, tip ends of the ejecting rods 58 and 59 abut against the protrusions 60 and 61. Thereafter, if the ejecting cylinder 55 is operated to further advance the piston rod 56, the ejecting pins 51 and 52 are advanced through the ejecting plate 53.

It should be noted that a flange portion 55a extends radially outward on the ejecting cylinder 55, and the pressurizing cylinder 41 is fixed to the flange portion 55a.

The pressurizing cylinder 41 and the ejecting cylinder 55 are actuated by hydraulic pressure, and a hydraulic pressure source 71 is connected with the pressurizing cylinder 41 through a solenoid directional control valve 73 and connected with the ejecting cylinder 55 through a solenoid directional control valve 74. The solenoid directional control valve 73 and the solenoid directional control valve 74 can assume a position A, a position B and a neutral position, so that they cause the piston rods 42 and 56 to be advanced respectively when in their positions A and to be withdrawn respectively when in their positions B.

If the ejecting rods 58 and 59 are withdrawn a predetermined amount by withdrawing the piston rod 56, the tip ends thereof are moved away from the ejecting plate 53, so that the ejector plate 53 cannot be further withdrawn. Likewise, if the pressurizing rod 46 is withdrawn by a predetermined amount by withdrawing the piston rod 42, the tip end thereof is moved away from the pressurizing plate 36, so that the pressurizing plate 36 cannot be further withdrawn.

A return pin 65 and a return spring 66 are disposed between the ejector plate 53 and the stationary die 12. Thus, with the retreating movement of the ejector rods 58 and 59, the ejector plate 53 is guided by the return pin 65 and forcedly withdrawn by the action of the return spring 66.

A return pin 67 and a return spring 68 are also disposed between the pressurizing plate 36 and the stationary die 12. Thus, with the retreating movement of the pressurizing rod 46, the pressurizing plate 36 is guided by the return pin 67 and forcedly withdrawn by the action of the return spring 68.

In the locally pressurizing type injection molding machine having the above-described construction, the movable platen 15 is advanced to effect the closing and clamping of the dies, and the resin is injected from the injection nozzle which is not shown. The resin is charged through the sprue 18, the runner 19 and the gates 20 into the cavity 21.

If a solenoid a of the solenoid directional control valve 73 is energized either in the middle of the pressure maintaining step for maintaining the pressure on the resin or at initial stage of the cooling step for the cooling the resin within the cavity 21, the piston rod 42 in the pressurizing cylinder 41 is advanced. During this time, the pressurizing cross head 43 and pressurizing rods 46 fixed to the piston rod 42 are also advanced, so that the pressurizing rods 46 push the pressurizing plate 36. Then, the pressurizing pin 33 mounted to the pressurizing plate 36 pushes the resin in the gates 20 to gate-cut the resin.

When the cooling step is completed and the dies have been opened, a solenoid a of the solenoid directional control valve 74 is energized, thereby permitting the piston rod 56 in the ejecting cylinder 55 to be advanced. During this time, the ejecting cross head 57 and ejector rods 58 and 59 fixed to the piston rod 56 are also advanced, so that the ejector rods 58 and 59 push the ejector plate 53. Then, the ejector pins 51 and 52 mounted to the ejector plate 53 push the sprue 18 and molded product, respectively (not shown), thereby ejecting the molded product, the sprue 18 and the runner 19.

Alternatively, the runner 19 and the molded product can be separated by conducting the ejection of the sprue 18 and the runner 19 and the ejection of the molded product conducted at discrete timings, respectively, leading to simplified structures of the stationary and movable dies 12 and 13.

As described above, the pressurizing rod 46 is sleeve-shaped, so that the ejector rod 59 extends within and through the pressurizing rod 46. Therefore, the pressurizing rods 46 and the ejector rods 59 are disposed coaxially, so that a space for the pressurizing rod 46 can be easily provided.

In general, in a straight-hydraulic die clamping system designed to conduct the opening and closing of dies by a hydraulic cylinder, a support post (which is not shown) is disposed for transmitting a clamping force to a back of a die-mounting surface of the movable platen 15 and hence, it is extremely difficult to add a pressurizing device to the usual ejecting device. According to the present invention, each of the ejector rods 59 of the ejecting device is disposed coaxillary with one of the pressurizing rods 46. Therefore, it is possible to easily provide room for the pressurizing rods.

Moreover, because the resin after being charged can be pressurized by the pressurizing device, it is possible not only to provide an extremely thin molded product, but also to prevent the generation of any sink mark.

A second embodiment of the present invention will be described below in connection with FIGS. 6 and 7.

Figure 6:
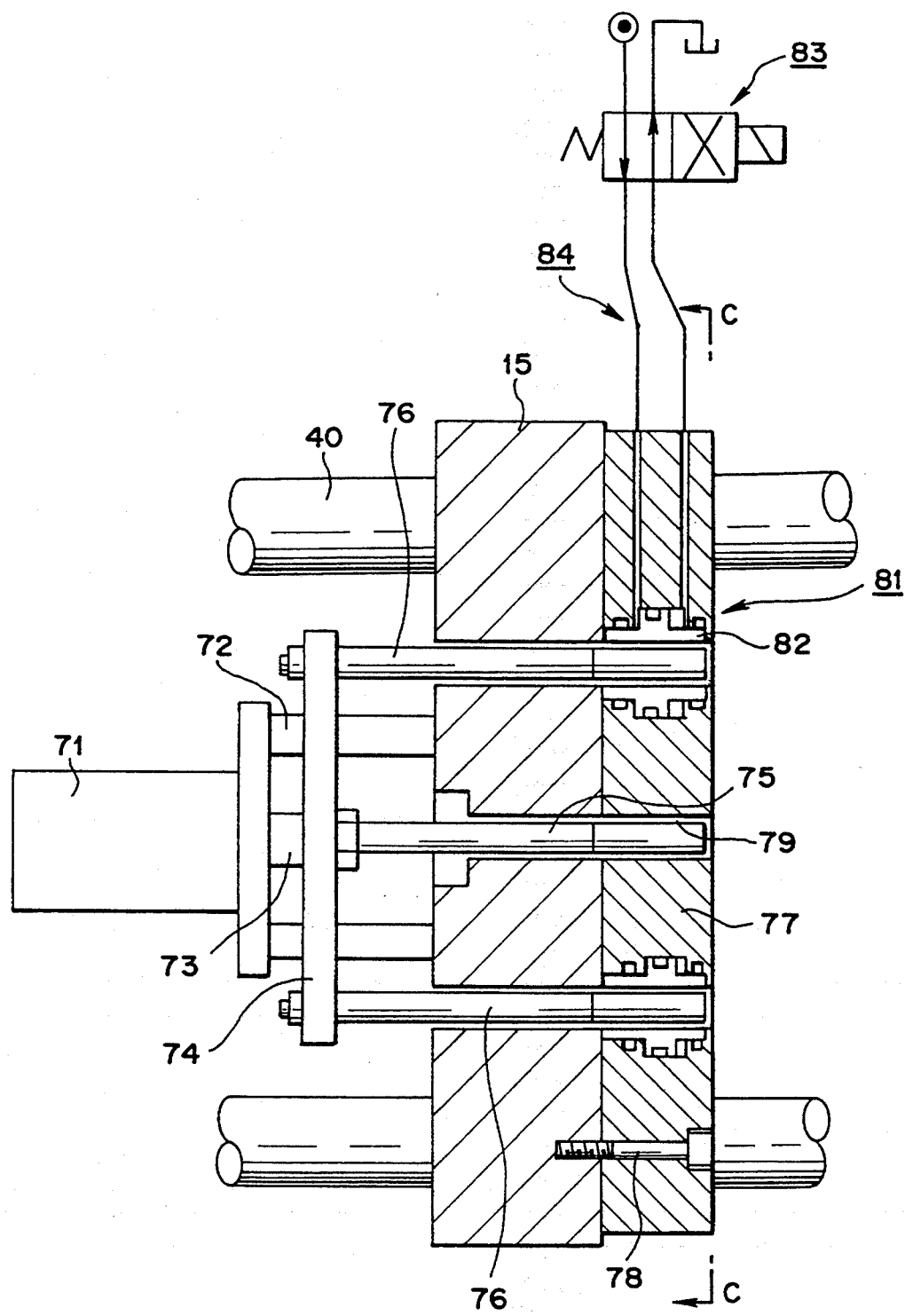
FIG. 6 is a sectional view of an essential portion of a locally pressurizing type injection molding machine according to a second embodiment of the present invention.
Figure 7:
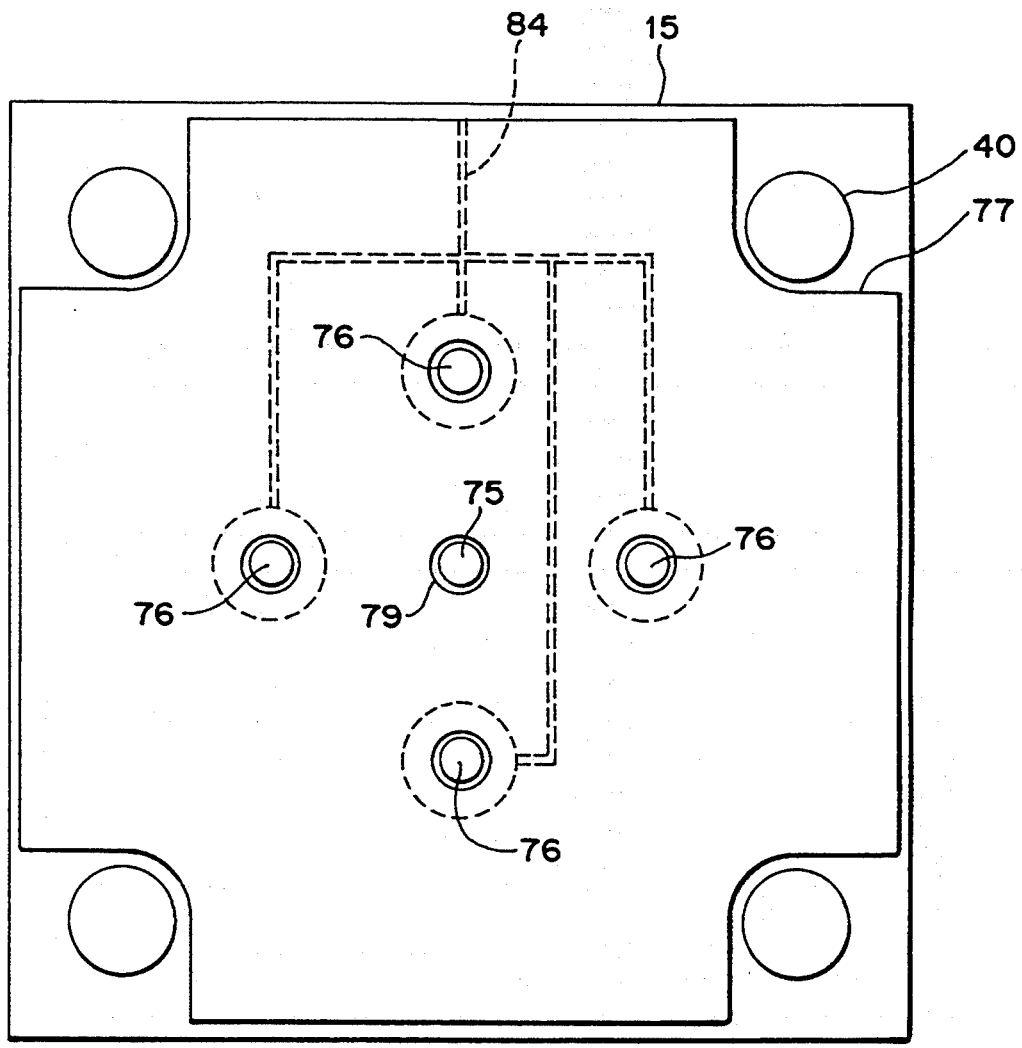
FIG. 7 is a sectional view taken along a line C—C in FIG. 6.
Figure 8:
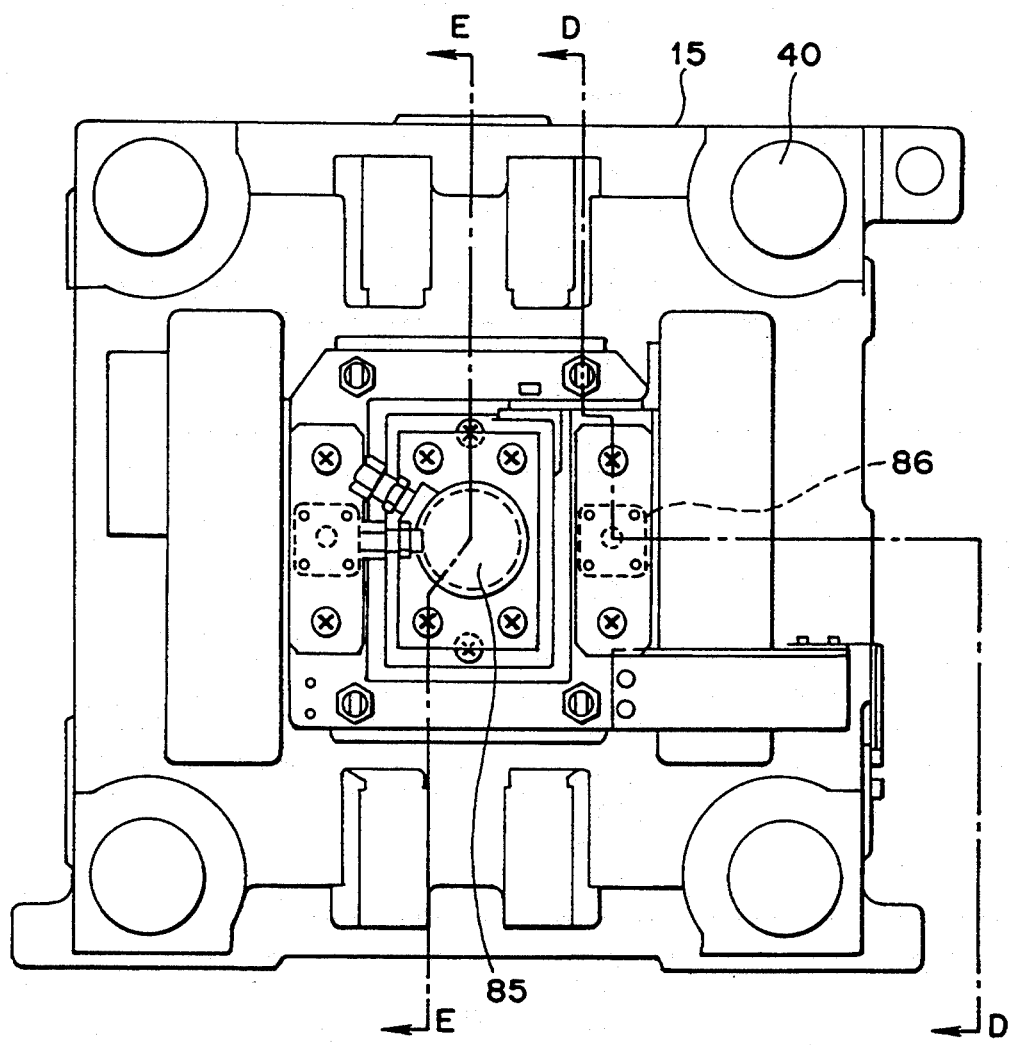
FIG. 8 is a front view of a movable platen in a locally pressurizing type injection molding machine according to a third embodiment of the present invention.

Referring to FIG. 6, the locally pressurizing type injection molding machine of the second embodiment comprises a movable platen 15, a tie bar 40, an ejecting cylinder 71, and a guide post 72 for supporting the ejecting cylinder 71.

A cross head 74 is fixed to a piston rod 73 in the ejecting cylinder 71, and ejector pins 75 and 76 are fixed to and project forwardly from the cross head 74 (rightwardly as viewed in FIG. 6).

On the other hand, a plate 77 is fixed to a die plate (which is not shown) of the movable platen 15 by a bolt 78. The plate 77 has a hole 79 centrally defined therein, through which the ejector pin 75 is passed. Pressurizing cylinders 81 are disposed at four places around the hole 79. Each of the pressurizing cylinders 81 includes a sleeve-like piston 82, having an increased diameter at its central portion, and has a front end face adapted to abut against a pressurizing pin which is not shown. The ejector pin 76 is adapted to pass through the piston 82.

The pressurizing cylinder 81 has an oil chamber connected to a solenoid directional control valve 83, so that the piston 82 and the pressurizing pin can be withdrawn by switchover of the solenoid directional control valve 83. It is noted herein that reference number 84 is an oil passage through which an oil is supplied to the oil chamber in the pressurizing cylinder 81.

A third embodiment of the present invention will be described in connection with FIGS. 8 to 11.

Referring to FIGS. 8-11, the locally pressurizing type injection molding machine of the third embodiment comprises a movable platen 15, a tie bar 40, an ejecting cylinder 85, a pressurizing cylinder 86, a guide post 87 for supporting the ejecting cylinder 85, and a guide post 88 for supporting the pressurizing cylinder 86.

Figure 9:
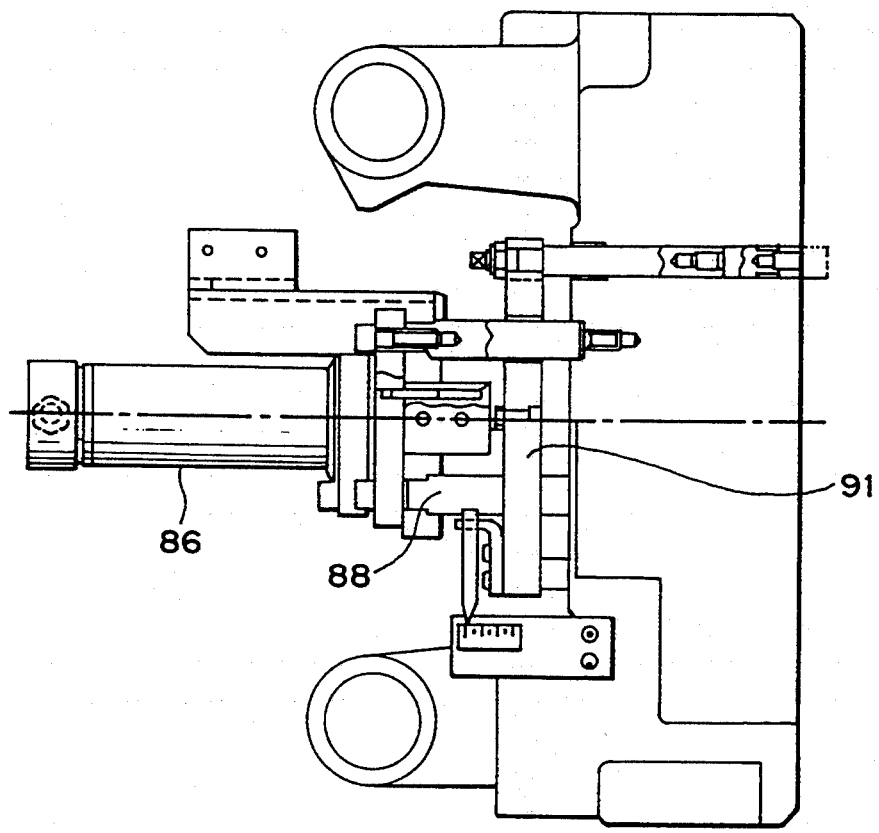
FIG. 9 is a sectional view of the movable platen in the locally pressurizing type injection molding machine, taken along a line D—D in FIG. 8.
Figure 10:
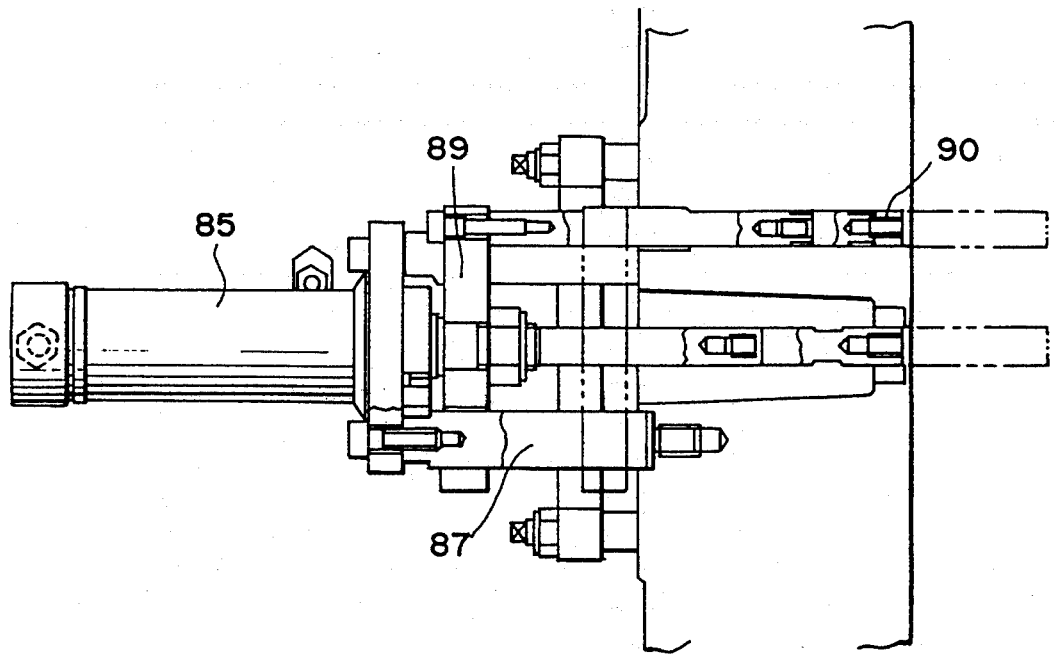
FIG. 10 is a sectional view of the movable platen in the locally pressurizing type injection molding machine, taken along a line E—E in FIG. 8.
Figure 11:
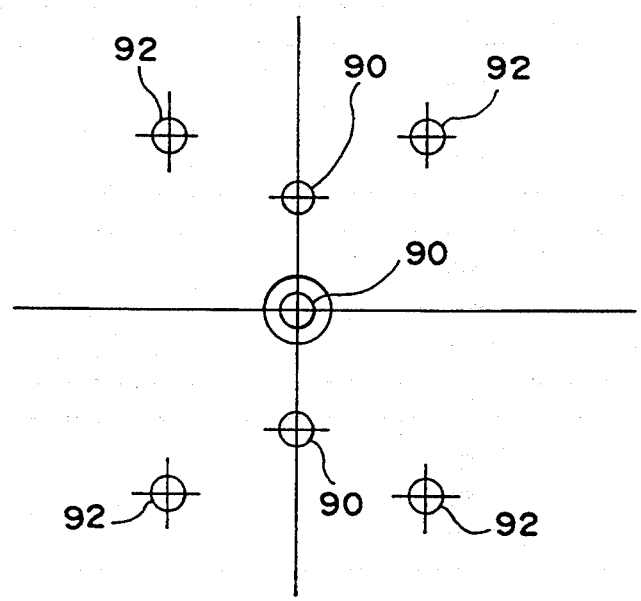
FIG. 11 is a diagram illustrating an arrangement of ejector pins and pressurizing pins in the locally pressurizing type injection molding machine shown in FIG. 8.

As shown in FIG. 10, a cross head 89 is fixed to a piston rod in the ejecting cylinder 85, and an ejector rod 90 is fixed to the cross head 89 and extends forwardly (rightwardly as viewed in FIG. 10). In addition, as shown in FIG. 9, a cross head 91 is fixed to a piston rod in the pressurizing cylinder 86, and a pressurizing rod 92 is fixed to the cross head 91 to project forwardly.

In this case, the ejector rod 90 and pressurizing rod 92 are not coaxial and are disposed at different discrete positions.

In this embodiment, the pressurizing pin 33 (see FIG. 2) is disposed to face the gate, so that the resin is gate-cut by the pressurizing pin 33, but alternatively, when the resin is only pressurized, the pressurizing pin 33 can be disposed to face another resin passage such as the runner 19, the cavity 21 or the like.

Figure 12:
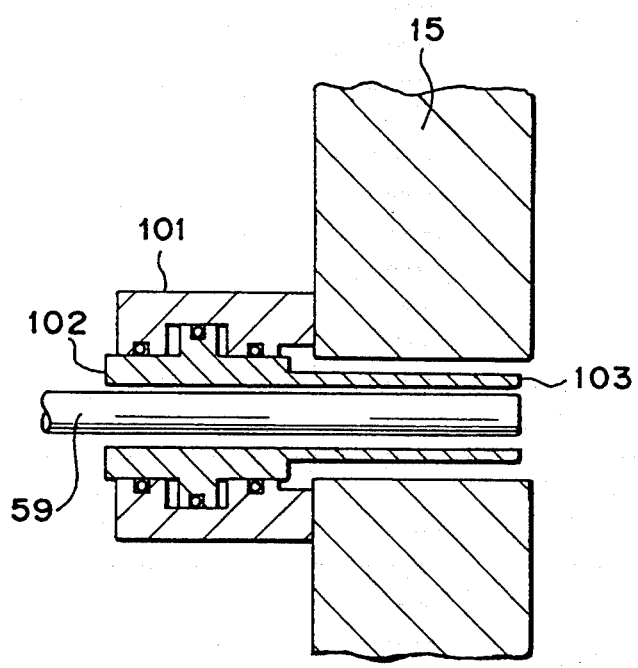
FIG. 12 is a sectional view of an essential portion of a locally pressurizing type injection molding machine according to a fourth embodiment of the present invention.

A fourth embodiment of the present invention will be described below in connection with FIG. 12.

The locally pressurizing type injection molding machine of the fourth embodiment comprises a movable platen 15, an ejector rod 59, and a plurality of pressurizing cylinders 101 disposed on the movable platen 15.

A sleeve-like pressurizing piston 102 is slidably received in the pressurizing cylinder 101 and has a sleeve-like pressurizing rod 103 integrally formed thereon to extend forwardly (rightwardly as viewed in FIG. 12) therefrom.

In this case, a pressurizing cross head 43 (see FIG. 2), as in the first embodiment, is not required. In addition, the pressurizing cylinders 101 can be controlled dependently from one another and operated with different timings of motion or in accordance with different pressurization programs.

Figure 13:
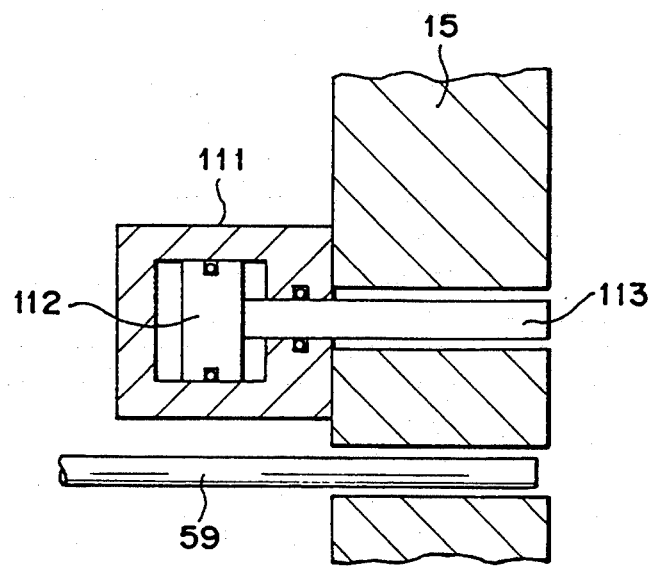
FIG. 13 is a sectional view of an essential portion of a locally pressurizing type injection molding machine according to a fifth embodiment of the present invention.

Referring now to FIG. 13, an essential portion of a locally pressurizing type injection molding machine according to a fifth embodiment of the present invention is illustrated in a sectional view.

As shown in FIG. 13, the injection molding machine of the fifth embodiment comprises a movable platen 15, an ejector rod 59, and a plurality of pressurizing cylinders 111 disposed on the movable platen 15.

A pressurizing piston 112 is slidably received in each of the pressurizing cylinders 111 and has a pressurizing rod 113 integrally formed thereon to extend forwardly (rightwardly as viewed in FIG. 13 ) therefrom.

In this case, a pressurizing cross head 43 (see FIG. 2), as in the first embodiment, is not required. In addition, the pressurizing cylinders 111 can be controlled dependently from one another and operated with different timings of motion or in accordance with different pressurization programs.

Figure 14:
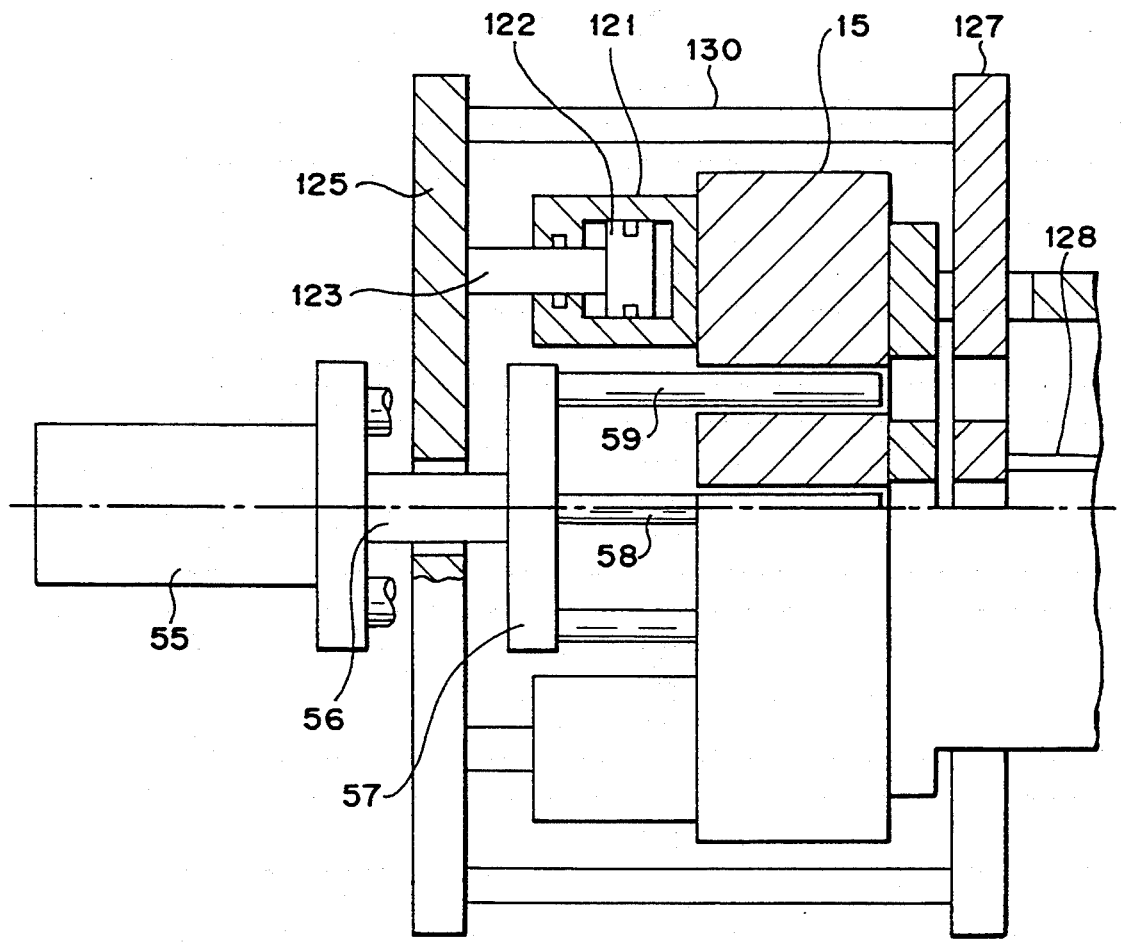
FIG. 14 is a sectional view of an essential portion of a locally pressurizing type injection molding machine according to a sixth embodiment of the present invention.

FIG. 14 illustrates an essential portion of a locally pressurizing type injection molding machine according to a sixth embodiment of the present invention in a sectional view.

As shown in FIG. 13, the injection molding machine of the sixth embodiment comprises a movable platen 15, an ejecting cylinder 55, a piston rod 56, an ejecting cross head 57, and ejector rods 58 and 59.

A plurality of pressurizing cylinders 121 are disposed on the movable platen 15. A pressurizing piston 122 is slidably received in each of the pressurizing cylinders 121 and has a piston rod 123 integrally formed thereon to extend rearwardly (leftwardly as viewed in FIG. 14) therefrom. A pressurizing cross head 125 is disposed at a trailing or rear end of the piston rod 123, so that it can be advanced and retreated by operation of the pressurizing cylinders 121.

On the other hand, a pressurizing plate 127 is movably disposed forward (rightwardly as viewed in FIG. 14) of the movable platen 15, and a rear or trailing end of a pressurizing pin 128 is fixed to the pressurizing plate 127. The pressurizing plate 127 and the pressurizing cross head 125 are interconnected by a pressurizing rod 130. In this case, the pressurizing rod 130 is mounted further outside the periphery of the movable platen 15 rather than extending through the movable platen 15.

Figure 15:
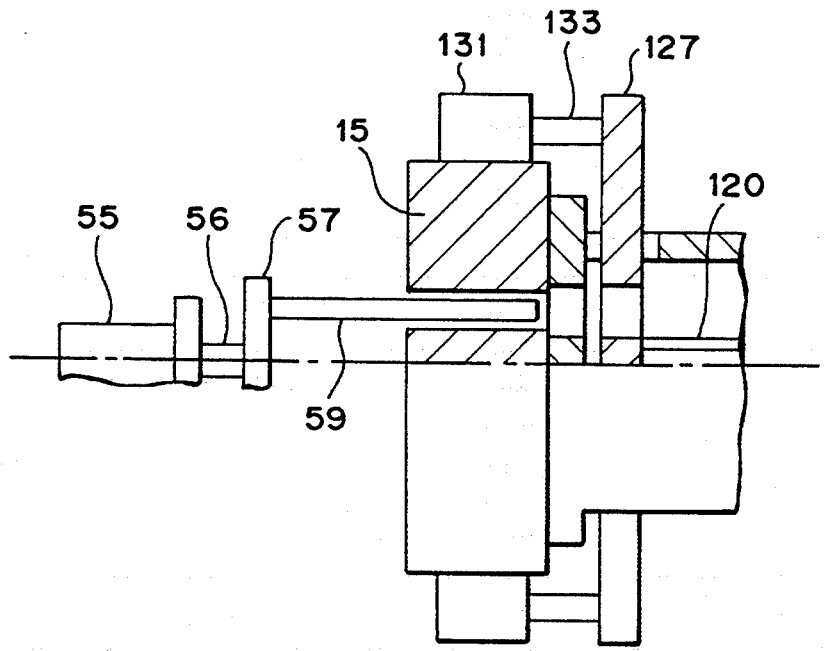
FIG. 15 is a sectional view of an essential portion of a locally pressurizing type injection molding machine according to a seventh embodiment of the present invention.

FIG. 15 illustrates an essential portion of a locally pressurizing type injection molding machine according to a seventh embodiment of the present invention.

As shown in FIG. 15, the injection molding machine of the seventh embodiment comprises a movable platen 15, an ejecting cylinder 55, a piston rod 56, an ejecting cross head 57, and an ejector rod 59.

A plurality of pressurizing cylinders 131 are disposed on the peripheral edge of the movable platen 15. A pressurizing piston (which is not shown) is slidably received in each of the pressurizing cylinders 131 and has a pressurizing rod 133 integrally formed thereon to extend forwardly (rightwardly as viewed in FIG. 15) therefrom.

A pressurizing plate 127 is fixed to a front end of the pressurizing rod 133, and a pressurizing pin 128 is fixed at its rear end to the pressurizing plate 127. In this case, the ejector rod 59 does not pass through the pressurizing rod 133.

It should be noted that the pressurizing rod 46, 92, 103, 113, 130 and 133 in each of the embodiments can be used for traction or rotation of a core or the like.

Figure 16:
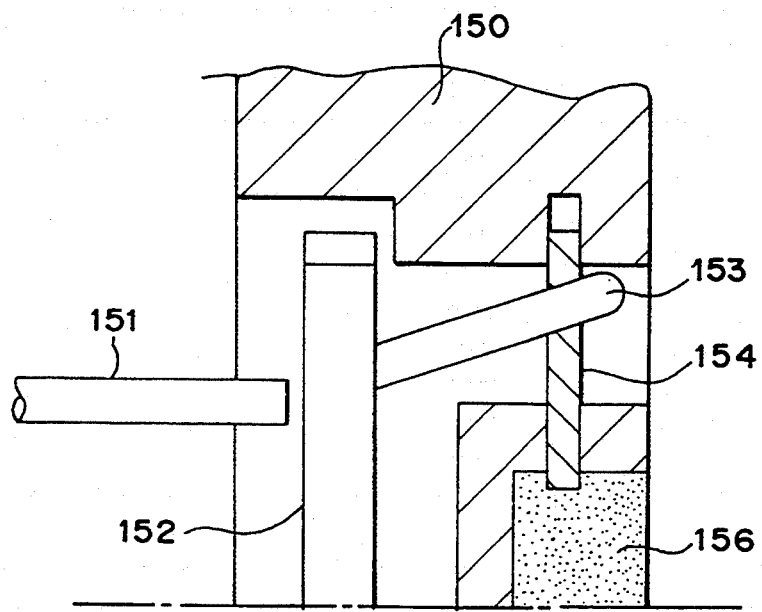
FIG. 16 is a partial view, in cross-section, illustrating operation of a pressurizing rod.

FIG. 16 illustrates operation of a pressurizing rod.

Referring to FIG. 16, there are shown a movable platen 150, a pressurizing rod 151, a pressurizing plate, an angular pin 153, a slide core 154, and a molded product 156.

In this case, the angular pin 153 can be advanced and withdrawn by the pressurizing rod 151, thereby moving the slide core. Therefore, a special mechanism for moving the slide core 154 is not required, leading to a simplified structure.

It will be understood that the present invention is not limited to the above-described embodiments, and various modifications and variations can be made without departing from the spirit and scope of the invention defined in claims.

What is claimed is:

1. A locally pressurizing injection molding machine comprising:
a stationary die;
a movable die disposed for movement into and out of contact with said stationary die to define a cavity therebetween and a resin passage for injecting resin into said cavity;
a pressurizing pin extending through said movable die to a distal end facing at least one of said resin passage and said cavity;

a pressurizing cylinder for reciprocally driving said pressurizing pin and a pressurizing rod, said pressurizing rod transmitting a driving force of said pressurizing cylinder to said pressurizing pin;

an ejector pin extending through said movable die to a distal end facing said cavity; and an ejecting cylinder for reciprocally driving said ejector pin and an ejector rod, said ejector rod being coaxial with said pressurizing rod transmitting a driving force of said ejecting cylinder to said ejector pin, said pressurizing rod being in the form of a hollow sleeve and said ejector rod extending through said hollow sleeve for sliding motion relative to said hollow sleeve.

2. A locally pressurizing injection molding machine in accordance with claim 1 comprising a plurality of said pressurizing rods mounted on and extending from a single pressurizing plate for movement in synchronism therewith, said single pressurizing plate being reciprocally driven by said pressurizing cylinder.

3. A locally pressurizing injection molding machine in accordance with claim 2 further comprising a single ejector rod plate carrying a plurality of said ejector rods, said single ejector rod plate being reciprocally driven by said ejecting cylinder.

4. A locally pressurizing injection molding machine in accordance with claim 1 further comprising a single ejector rod plate carrying a plurality of said ejector rods, said ejector rod plate being reciprocally driven by said ejecting cylinder.

5. A locally pressurizing injection molding machine in accordance with claim 1 wherein said pressurizing pin is mounted on a plate reciprocally driven by said pressurizing rod.

6. A locally pressurizing injection molding machine in accordance with claim 1 wherein said ejector pin is mounted on a plate reciprocally driven by said ejecting rod.

7. A locally pressurizing injection molding machine in accordance with claim 5 wherein said ejector pin is mounted on a plate reciprocally driven by said ejecting rod.

* * * * *